July 1, 1969 R. A. HANSON 3,452,461
GRADE TRIMMING AND SPREADING APPARATUS
Filed March 10, 1967 Sheet 1 of 7

INVENTOR.
RAYMOND A. HANSON
BY Wells & St. John
Attys.

INVENTOR.
RAYMOND A. HANSON

000000# United States Patent Office 3,452,461
Patented July 1, 1969

3,452,461
GRADE TRIMMING AND SPREADING APPARATUS
Raymond A. Hanson, Palouse, Wash. (Box 19148, Spokane International Airport, Spokane, Wash. 99219)
Filed Mar. 10, 1967, Ser. No. 622,271
Int. Cl. E02f 5/00, 3/24; E01c 19/02
U.S. Cl. 37—110                                    7 Claims

ABSTRACT OF THE DISCLOSURE

The disclosure describes a grade trimming and spreading apparatus for preparing a selected subgrade surface. The apparatus has two sections that are connected together through ball joints enabling the sections to turn and twist in relation to each other. An auger assembly is pivotally mounted to the front section forward of the front wheels. The auger blade has interlocking members for forming a continuous spiral blade.

Background of the invention

This invention relates to equipment for making roads and highways and more particularly to an improved high speed grade trimming and spreading apparatus for removing soil and forming a selected subgrade surface in preparing a road bed.

One of the principal requirements in grade preparation of a highway is to accurately move the soil to a predetermined elevation with a selected slope. In the apparatus that I have described and claimed in my patent application Ser. No. 494,092, filed Oct. 8, 1965, complicated and expensive leveling mechanisms are used to maintain the digging mechanism in the proper plane to obtain the desired subgrade surface.

Objects and summary of the invention

One of the principal objects of my invention is to provide a high speed grade trimming and spreading apparatus that does not require a complicated expensive leveling mechanism for maintaining the digging mechanism at the proper plane and elevation.

An additional object of my invention is to provide a high speed grade trimming and spreading apparatus that is accurate and efficient in operation, simple in construction and economical to manufacture.

With these and other objects in mind, my invention concerns a high speed grade trimming and spreading apparatus in which an auger mechanism is positioned forward of the propelling wheels or tracks. The main frame of the apparatus is formed in two sections with connecting mechanisms that enable one section to arcuately move horizontally with respect to the other section. The connecting mechanism also enables one section to twist with respect to the other.

Brief description of the drawings

A preferred embodiment of my invention is illustrated in the accompanying drawings, in which.

Detailed description of the preferred embodiment

Figure 1:
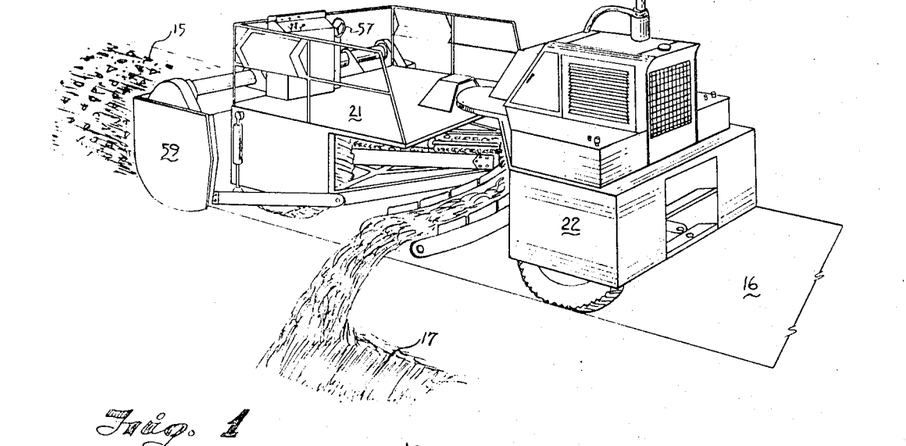
FIG. 1 is a perspective view of a grade trimming and spreading apparatus that incorporates the principal features of my invention.

Referring now in detail to the drawings, there is shown in FIG. 1 a grade trimming and spreading apparatus for preparing a roadbed by excavating the top surface 15 of the soil to a desired subgrade surface 16 and discharging the soil from the side of the excavator to form a windrow 17.

The supporting vehicle has a main frame divided into a front section 21 and a rear section 22 articulately connected together.

Figure 5:
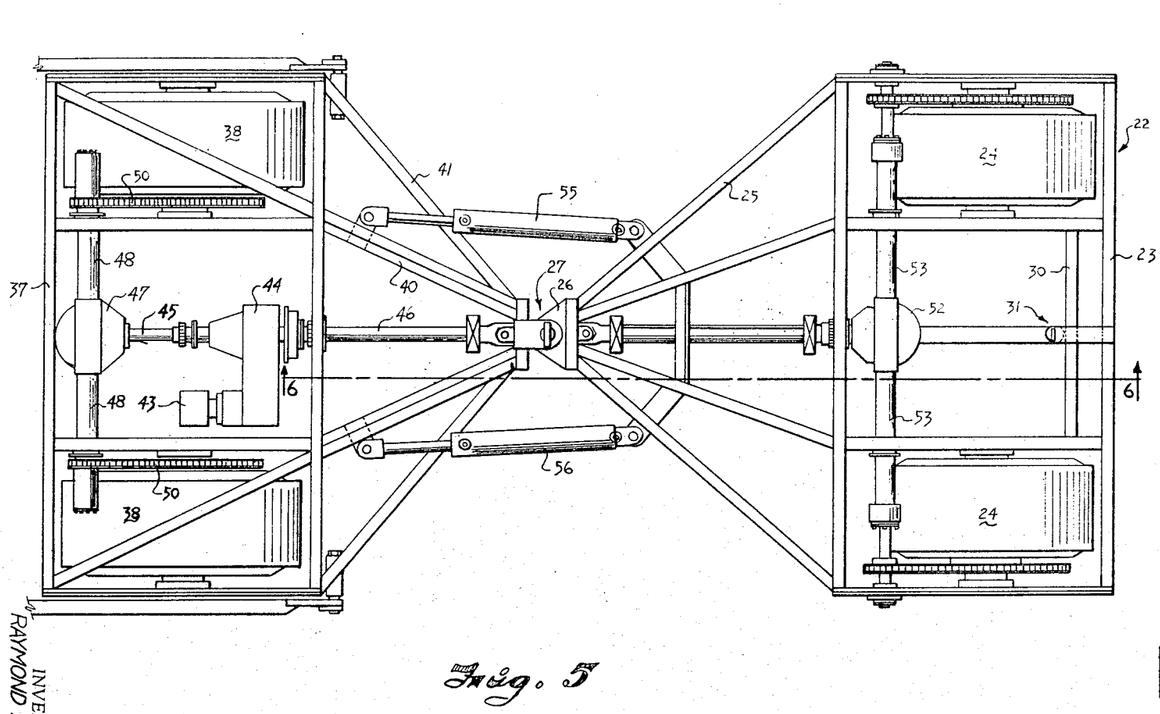
FIG. 5 is a fragmentary plan view of the apparatus frame with the covering removed to show the basic structural and drive mechanisms of the apparatus.
Figure 6:
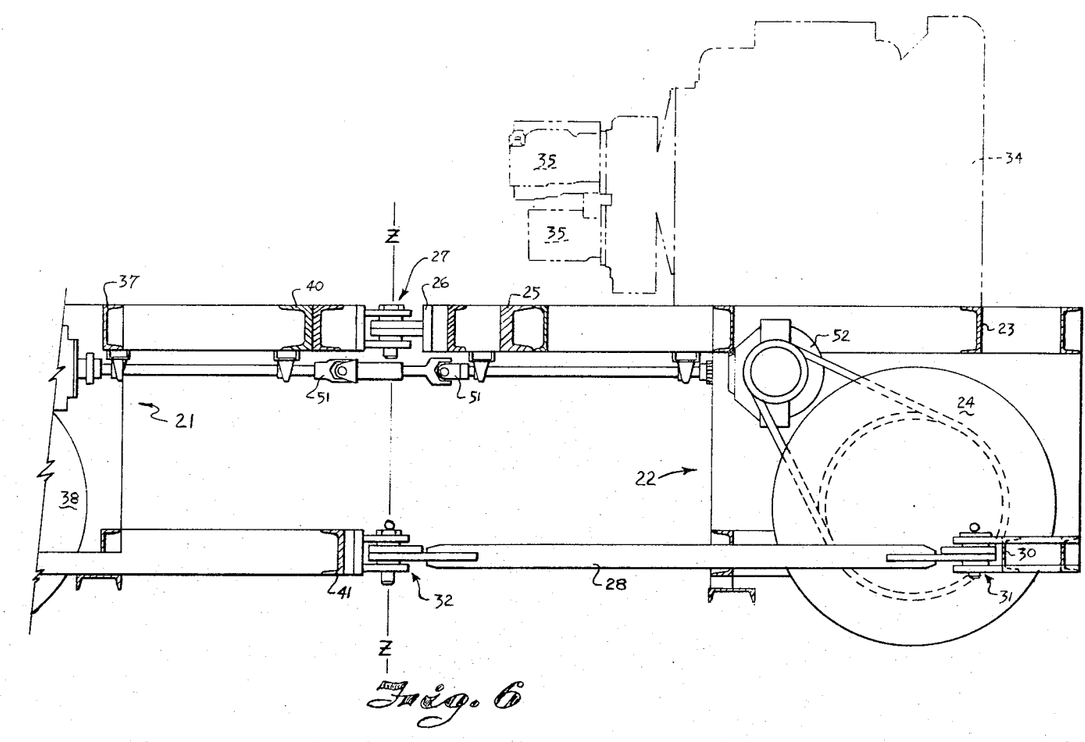
FIG. 6 is a fragmentary cross sectional view taken along line 6—6 in FIG. 5.

As shown in FIGS. 5 and 6, the rear section 22 has a rear frame 23 supported by earth engaging means such as wheels 24 that are rotatably mounted to frame 23. An upper converging extension 25 is mounted to rear frame 23 and extends forward to a connecting plate 26. The upper conversion extension 25 is articulately connected to the front section 21 of the highway excavator by a ball joint 27. A lower swing arm 28 is positioned below extension 25 and is aligned in a substantially longitudinal orientation. The rear end of arm 28 is pivotally connected to a lower cross-frame member 30 of the frame 23 by a ball joint 31. The forward end of the swing arm 28 is pivotally connected to the front section 21 of the highway excavator through a ball joint 32.

A diesel engine 34 shown in phantom in FIG. 6, is mounted on rear frame 23. Engine 34 drives hydraulic pumps 35 that provide hydraulic pressure to hydraulic motors that operate the grade trimming and spreading apparatus.

The front section 21 has a frame 37 that may be particularly seen in the plan view of FIG. 5. The front frame 37 is supported on ground engaging means such as wheels 38 that are rotatably mounted to the frame 37. The frame 37 has a rigid upper converging extension 40 that faces rearward for connection with ball joint 27. A lower converging extension 41 is rigidly attached to frame 37. It extends rearwardly and is connected to ball joint 32. As may be particularly seen in FIG. 6, ball joints 27 and 32 are aligned vertically along the Z axis to enable one section to arcuately turn in relationship to the other section of the apparatus. The swing arm 28, being pivotally mounted at both ends, also enables sections 21 and 22 to twist in relationship to each other so that all of the wheels will maintain engagement with the prepared subgrade surface 16 even though it might include indentations or peaks.

The front and rear wheels 24 and 38 are driven by a hydraulic drive system that includes a hydraulic motor 43. The motor 43 is connected to a gear reduction unit 44 that rotates drive shafts 45 and 46. Drive shaft 45 extends forward to a differential 47. Axles 48 of the differential 47 are connected to endless drive chains 50 for rotating the front wheels 38. Drive shaft 46 extends through the universal joints 51 to a differential 52. Axles 53 of the differential 52 are connected to endless drive chains 54 for rotating the rear wheels 24. The gear reduction unit is designed so that the operator may propel the vehicle by driving either the front or rear wheels or both.

The apparatus is provided with a hydraulic steering system in which hydraulic cylinders 55 and 56 extend between the upper converging extension 25 of the rear frame and the upper converging extension 45 of the front frame. When the piston rod of hydraulic cylinder 55 extends and the piston rod of the hydraulic cylinder 56 contracts the vehicle turns to the left. When the piston rod of hydraulic cylinder 55 is contracted and the piston rod of hydraulic cylinder 56 is extended the vehicle turns to the right. The hydraulic pressure to the hydraulic cylinders 55 and 56 is controlled by conventional valve controls under direction of a steering wheel 57 mounted to the front frame 43 which may be easily manipulated by the operator.

Figure 3:
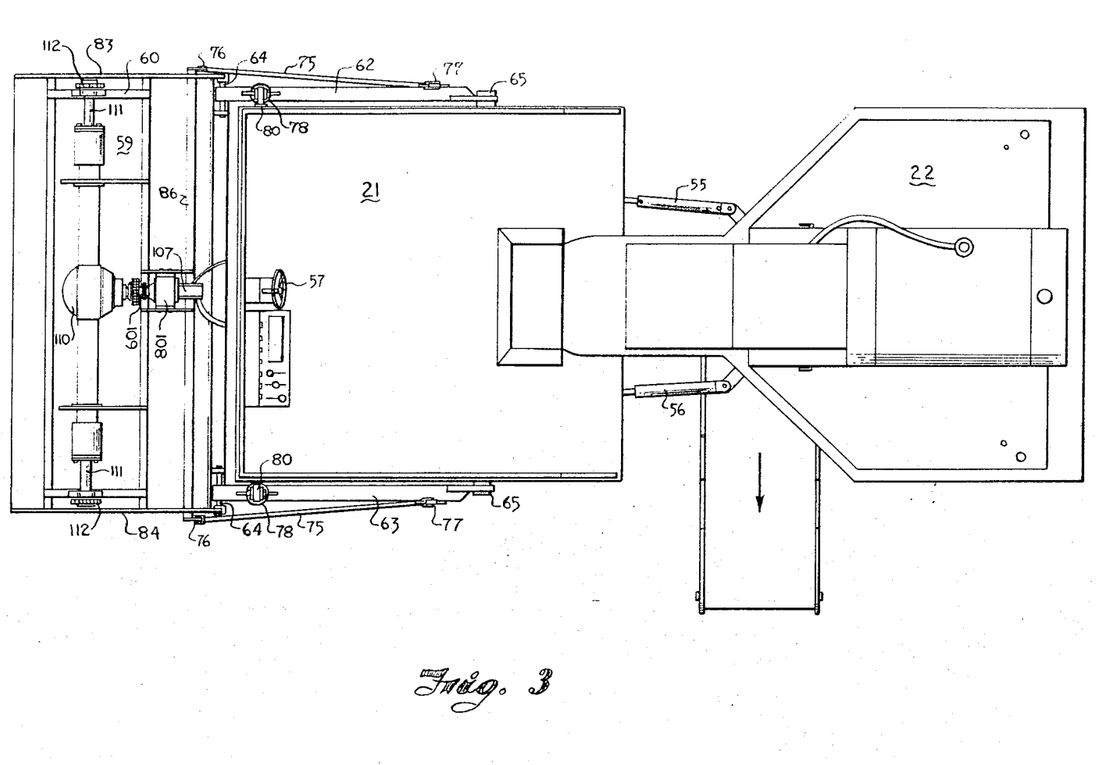
FIG. 3 is a plan view of the apparatus.
Figure 4:
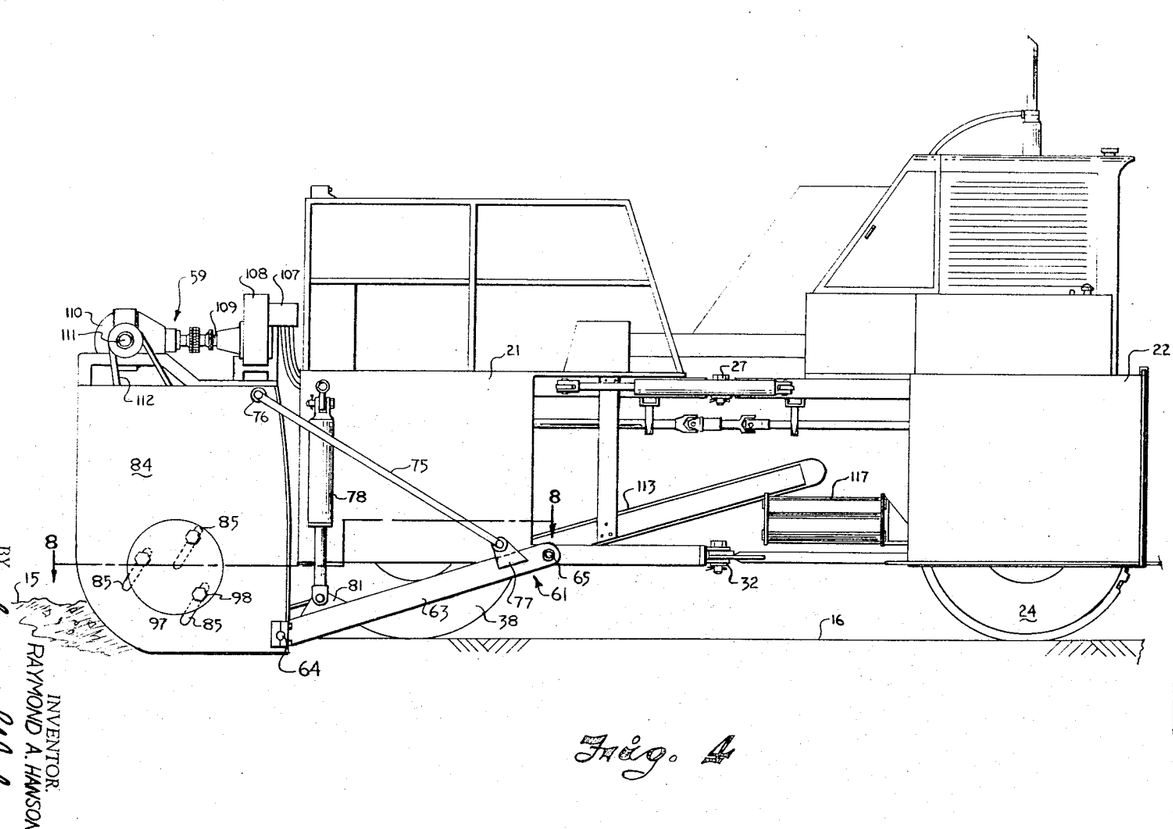
FIG. 4 is a side elevation view of the apparatus shown from the left side.

An auger assembly 59 is positioned forward of the front section 21. A housing 60 of the auger assembly 59 is pivotally mounted to the front frame 43 by a suspension system 61. The suspension system 61 includes arms 62 and 63 that are pivotally connected to the rear of the front frame 43 and extend alongside the front frame 43 to the base of the auger housing 60 (FIGS. 3 and 4). The forward ends of arms 62 and 63 are pivotally mounted to shafts 64 that protrude from the base of housing 60. The rear ends of arms 62 and 63 are pivotally connected to the front frame 43 through ball joints 65.

Figure 9:
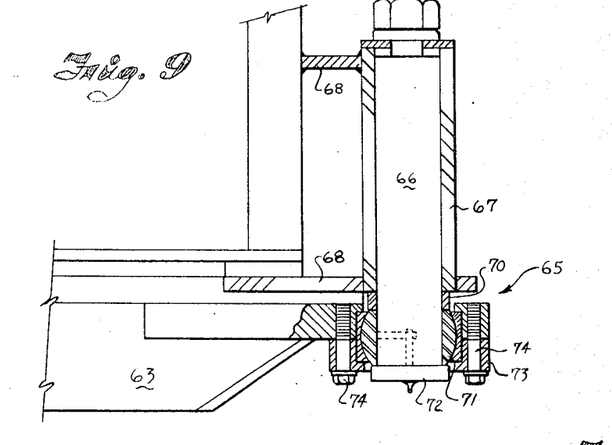
FIG. 9 is an enlarged fragmentary cross sectional view taken on circle 9—9 in FIG. 8.

As is shown in detail in FIG. 9, each ball joint 65 includes a shaft 66 that extends from a cylindrical housing 67. The housing 67 is supported at the rear corners of the front frame by brackets 68. A spacer 70 is mounted on the extending end of the shafts 66 against the housing 67. A ball bushing set 71 is mounted to the end of the shaft against the spacer 70. A ball joint cap 72 is secured on the end of the shaft 66 to hold the ball bushings against the spacer 70. The outer race of the ball bushing set 71 is secured between the rear end of the arm and a bushing housing clamp 73 by bolts 74. Braces 75 (FIGS. 3 and 4) are connected between brackets 76 fixed to the upper portion of the auger housing 60 and brackets 77 affixed to the arms 62 and 63 intermediate the ends. The braces 75 prevent the auger housing from rotating about the shafts 64. The ball joints 65 not only enable the auger assembly to pivot up and down in front of the front section 21, but also permit a limited degree of lateral twisting to occur.

The auger assembly 59 is pivoted about the ball joints 65 by hydraulic drive means including hydraulic cylinders 78 that are mounted to the sides of base frame 37 by brackets 80. The piston rods of cylinders 78 extend down to brackets 81 affixed to the forward end of the arms 62 and 63. The auger assembly 59 is raised and lowered by actuating the hydraulic cylinders 78.

Figure 8:
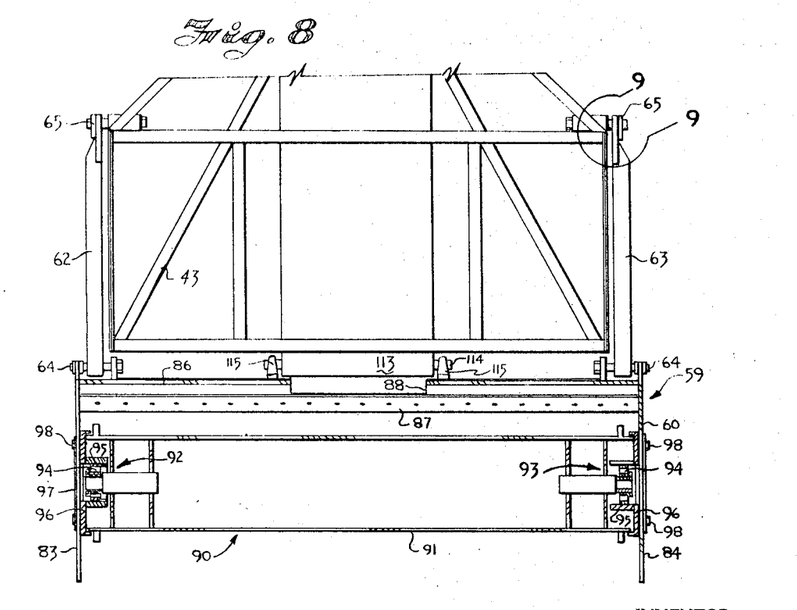
FIG. 8 is an enlarged fragmentary cross sectional view taken on line 8—8 in FIG. 4.

The auger housing 60 includes side plates 83 and 84 separated from one another by a distance greater than the width of the front frame 73. Each side plate 83, 84 has diagonal apertures 85 (FIG. 4) formed therein that project forward and downward. A back plate 86 extends between the side plates 83 and 84 to form the back of the auger housing. A moldboard 87 is affixed to the bottom of the back plate 86 between the side plates 83 and 84. Near the center of the back plate an aperture 88 (FIGS. 2 and 8) is formed therein slightly above the moldboard 87, permitting soil to move therethrough.

The auger assembly includes an auger 90 that comprises an auger shaft 91 rotatably supported on bearing assemblies 92 and 93 adjustably positioned by end plates 83 and 84 respectively. As may be particularly seen in FIG. 8, each of the bearing assemblies 92 and 93 has a roller bearing 94 mounted to the ends of auger shaft 91. A housing 95 is attached to the outer race of the roller bearing 94. The housing 95 is affixed to an inner plate 96 mounted against the inside of the side plates. An outer plate 97 is mounted on the outside of the side plates 83 and 84 with mounting bolts 98 extending therethrough to the inner plate 96. To adjust the position of the auger 90 in relationship to the auger housing 60, one needs only to loosen bolts 98 and slide the mounting bolts in the diagonal apertures 85 in the side plates 83 and 84. Thus, it may be said that the auger may be vertically and horizontally adjusted in relationship to the auger housing 60 and the moldboard 87.

Figure 7:
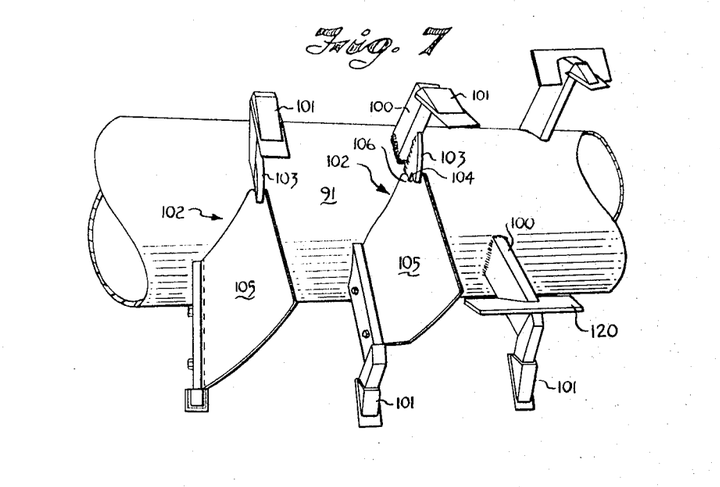
FIG. 7 is a fragmentary enlarged perspective view of the auger shaft showing the digging shoes and the auger blades.
Figure 10:
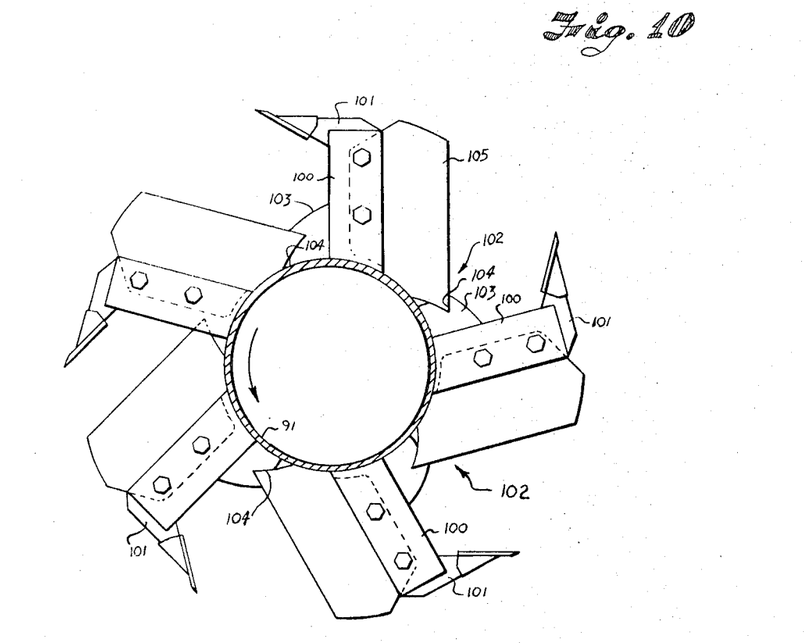
FIG. 10 is an enlarged fragmentary cross sectional view taken on line 10—10 in FIG. 2.

The auger 90 also includes auger shanks 100 (FIGS. 2, 7 and 10) affixed to auger shaft 91 in spiral patterns. The shanks 100 extend radially from auger shaft 91 about its circumference. Digging shoes 101 are affixed to the radial ends of auger shanks 100 for digging and loosening soil as the auger is rotated. The shoes 101 extend substantially tangential to the ends of the auger shanks 100 for performing a digging and loosening action as the auger is rotated.

Auger blades 102 extend between the auger shanks in such a manner as to form spiral paths about the auger shaft 91. Each auger blade 102 includes two sections. The first section comprises a member 103 affixed to the forward side of the shank 101 in its direction of rotation, and extends circumferentially therefrom. The forward edge of the member 103 has a notch 104 formed therein. The second section of the blade 102 includes a contoured member 105 that has an edge with a notch 106 formed therein that is complementary to the notch 104 of the first section. The member 105 is releasably bolted to the shank and extends from the rear thereof in a spiral path to engage and interlock with the member 103 that extends from a shank 100 in the same spiral path. The interlocking of the notched edges of the members 103 and 105 forms a rigid continuous blade between the shanks.

Figure 2:
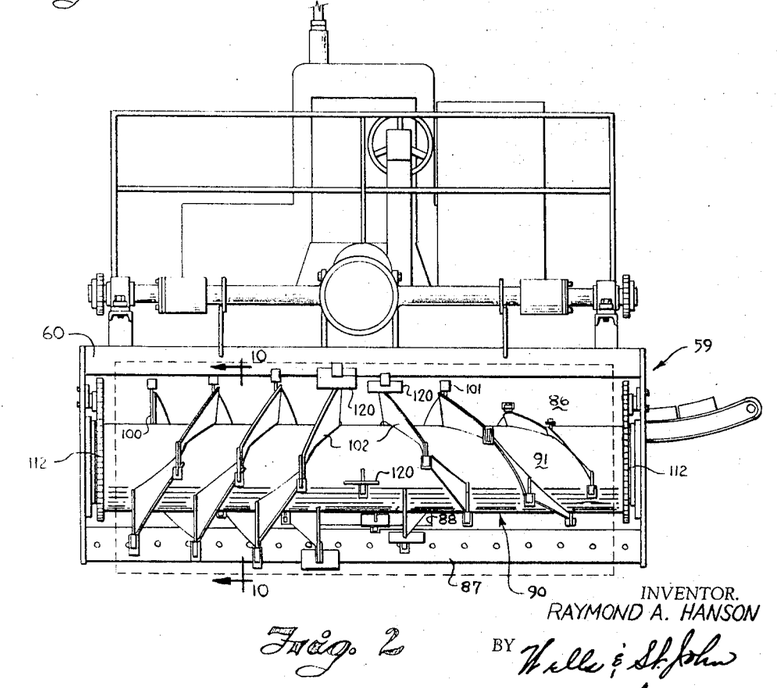
FIG. 2 is a front elevation view of the apparatus.

As may be particularly seen in FIG. 2 the blades 102 and the shanks 100 form a double spiral pattern for urging the soil to the center of the auger. If it is desired that the excavator be used as a spreader then the blade members 105 may be bolted to the other side of the shank and extend in an opposite spiral direction so that when the auger is rotated the auger will cause the soil to be spread longitudinally outward along the auger. No engagement of the notches is required in this configuration, which will be normally used when spreading loose material.

Plates or paddles 120 are attached at an inclined angle to the ends of the central shanks 100. As the auger rotates, the paddles 120 push the loosened soil over the moldboard 87 and through the aperture 88 in the back plate 86 of the auger housing.

The auger 90 is driven by a hydraulic motor 107 (FIGS. 3 and 4) through a gear reduction unit 108. A drive shaft 109 extends from the gear reduction unit 108 to a differential 110. Differential shafts 111 extend from the differential 110 parallel to the axis of the auger 90. The shafts 111 drive chains 112 to rotate the auger 90 in a counterclockwise direction as viewed in FIG. 10. The digging shoes 101 move down and through the soil in somewhat of a shoveling manner. As the auger is rotated (FIG. 2) the soil is moved along the auger toward the center. As the soil moves to the center it is also moved toward the back plate 86 of the auger housing and moves over the moldboard 87 and through the aperture 88.

A moving conveyor 113 (FIG. 8) having a shaft 114 is mounted to the rear of the back plate 86 by bearing brackets 115. As the soil moves through the aperture 88 it is deposited upon the moving conveyor 113.

The conveyor 113 transports the soil back through the front frame 43 and onto a transverse moving conveyor 117. The conveyor 117 carries the earth to the side of the apparatus as may be seen in FIG. 1 and is deposited in the windrow 17. If it is desired to discharge the soil out the back of the rear frame 23, the conveyor 117 may be mounted longitudinally to the rear frame and extend outwardly from the rear of rear frame 23. The vehicle frame is unobstructed longitudinally and at its center portion to permit flexibility in conveyor positioning.

If it is desired to use the apparatus for spreading soil, the operator need only remove the auger blade members 105 from the shanks 100 from the auger shank and reposition the blade on the other side of the shank so that the blade extends outwardly along the auger to spread the soil.

It is understood that the above described embodiment is simply illustrative of the application of the principles of this invention. Numerous other embodiments may be readily devised which embody the principles of this invention and fall within the spirit and scope thereof. Therefore, only the following claims are intended to define my invention.

What is claimed is:

1. A high speed highway excavator for preparing a roadbed, comprising:
   (a) a front frame positioned on front wheels that are rotatably mounted to the front frame, said front frame including:
      (1) an upper converging rigid extension that extends rearward, and
      (2) a lower rigid converging extension that extends rearward parallel to the upper extension;
   (b) a rear frame supported on rear wheels that are rotatably mounted to the rear frame, said rear frame including:
      (1) an upper rigid converging extension that extends forward adjacent the upper front frame extension, and
      (2) a swing arm that is joined to the lower portion of the rear frame by a ball joint and extends forward adjacent the lower front frame extension;
   (c) vertically aligned ball joints that connect the upper front extension with the upper rear frame extension and the lower front frame extension and the swing arm for enabling one frame to pivot and longitudinally rotate in relationship to the other;
   (d) a drive means for rotating the front and rear wheels, said drive means comprising:
      (1) a hydraulic motor,
      (2) a gear reduction unit connected to the motor,
      (3) a rear differential connected to the gear reduction unit by a second drive shaft,
      (4) a front differential connected to the gear reduction unit by a second drive shaft,
      (5) axles extending from the front and rear differentials over the wheels, and
      (6) endless chains connected between the axles and the wheels;
   (e) a pair of hydraulic cylinders extending between the front and rear frame for pivoting one frame in relationship to the other for steering the excavator;
   (f) an auger assembly comprising:
      (1) a transverse auger housing movably mounted to and forward of the front frame for up and down movement, said housing having a center aperture formed therein,
      (2) an auger rotatably mounted in the auger housing, said auger having auger blades that are positioned in a spiral configuration to move the soil toward the center of the auger and rearward through the center aperture of the auger housing, and
      (3) a drive means mounted to the auger housing for rotating the auger, and
   (g) a conveyor system for receiving the soil moved rearward through the housing aperture and discharging the soil from the excavator.

2. A highway excavator for preparing a road bed, comprising:
   (a) a movable carriage supported by front and rear earth engaging members;
   (b) a transverse auger digging device movably mounted to the carriage forward of the earth engaging members for removing soil to a predetermined grade in advance of the earth engaging members;
   said mobile carriage comprising:
   (c) a front frame supported by the forward earth engaging members; and
   (d) a rear frame supported by the rear earth engaging members and hinged to the front frame to enable the vehicle to move in an arcuate path and to further permit one frame to twist in relation to the other; and
   (e) drive means operatively connected between the front and rear frames for arcuately moving one frame in relationship to the other to steer the vehicle;
   (f) said front frame having rigid upper and lower extensions facing rearward, said rear frame having a rigid extension facing forward for connection with the upper extension of the front frame and a pivotal lower extension arm facing forward and connecting to the lower extension of the front frame for enabling the rear frame to articulate in relationship to the front frame.

3. A highway excavator for preparing a road bed, comprising:
   (a) a movable carriage supported by front and rear earth engaging members;
   (b) a transverse auger digging device movably mounted to the carriage forward of the earth engaging members for removing soil to a predetermined grade in advance of the earth engaging members;
   the auger digging device comprising:
   (c) a transverse housing that is movably mounted to the carriage;
   (d) an auger shaft rotatably mounted to the housing;
   (e) a plurality of digging shoes affixed to the shaft in a spiral configuration for loosening the soil;
   (f) a plurality of auger blades mounted to the shaft at an acute angle to the longitudinal axis of the shaft to form a spiral path for moving the loosened dirt longitudinally along the shaft toward the longitudinal center;
   (g) a moldboard mounted to the lower edge of the housing along the full length of the auger shaft for receiving the loosened soil and smoothing the surface of the grade;
   (h) each of the auger blades having two sections in which one section is affixed to one of the shoes in a spiral path and the other section is attached to one of the adjacent shoes in the same spiral path and wherein further each section of the auger blade has a notch that complementarily receives the other section to form an interlock.

4. The excavator as defined in claim 3 wherein one of the auger blade sections is adjustable and may be positioned in a spiral path for moving the soil longitudinally outwardly when the auger shaft is rotated to spread the soil.

5. A grade trimming and spreading apparatus comprising:
   a movable support vehicle having a ground-supported vehicle frame including earth engaging member, said vehicle being self-propelled for forward movement during normal operation;
   a transverse auger assembly;
   vertically adjustable mounting means operatively connected between the vehicle frame and the auger assembly for supporting the auger assembly at a location forwardly adjacent to and longitudinally centered with respect to the vehicle frame; said auger assembly being forward of the earth engaging members;
   power means operatively connected between the vehicle frame and said mounting means for selectively varying the elevation of the auger assembly relative to the vehicle frame;
   said transverse auger assembly comprising:
   a transverse framework extending across the full width of the vehicle frame, including the earth engaging members;

a transverse auger shaft extending across the full width of the vehicle frame and rotatably supported at its ends by said transverse framework for rotational motion about the shaft longitudinal center axis;

a plurality of digging shoes fixed to said shaft, each of said shoes projecting outwardly from the shaft an identical radial distance with respect to the shaft axis, the shoes being arranged across the full width of the shaft in a continuous spiral pattern;

auger blades mounted to the shaft at an acute angle with respect to the shaft axis in a spiral path, the auger blades being arranged in a continuous pattern across the full width of the shaft;

and a moldboard mounted to the transverse framework rearwardly adjacent to the auger shaft, digging shoes and auger blades, said moldboard having a transverse lower edge extending continuous across the full width of the auger shaft.

6. The apparatus set out in claim 5 wherein the transverse framework has an opening formed therein at its center immediately above the moldboard;

the spiral paths of the digging shoes and auger blades converging in opposed fashion at the center of the transverse framework;

and transverse paddles mounted to the digging shoes located longitudinally forward of said framework opening.

7. The apparatus as set out in claim 6 further comprising:

conveyor means on said vehicle frame leading from a location rearwardly adjacent and immediately below said framework opening to a location outward of the vehicle frame for carrying material received thereby rearwardly through the framework opening.

References Cited

UNITED STATES PATENTS

| | | | |
|---|---|---|---|
| 867,003 | 9/1907 | Blaisdell | 37—108 XR |
| 1,258,299 | 3/1918 | Bayley | 84—39.511 |
| 1,410,585 | 3/1922 | McCall | 37—108 |
| 1,421,383 | 7/1922 | Beardsley et al. | 37—190 |
| 1,850,814 | 3/1932 | Snyder | 37—190 |
| 2,064,807 | 12/1936 | Barber | 94—40 |
| 2,169,518 | 8/1939 | Brady et al. | 37—190 XR |
| 2,397,782 | 4/1946 | Flynn | 94—40 |
| 2,416,731 | 3/1947 | Baldwin | 172—277 XR |
| 2,669,338 | 2/1954 | Kling | 37—190 XR |
| 2,696,375 | 12/1954 | Huff | 37—190 XR |
| 2,709,312 | 5/1955 | Seifert | 37—190 |
| 3,314,175 | 4/1967 | Petty et al. | 37—108 |
| 3,316,822 | 5/1967 | Seaman | 37—117.5 XR |

EDGAR S. BURR, *Primary Examiner.*

U.S. Cl. X.R.

37—108, 189, 190; 94—40